(12) United States Patent
Farivar et al.

(10) Patent No.: US 10,664,742 B1
(45) Date of Patent: May 26, 2020

(54) SYSTEMS AND METHODS FOR TRAINING AND EXECUTING A RECURRENT NEURAL NETWORK TO DETERMINE RESOLUTIONS

(71) Applicant: Capital One Services, LLC, McLean, VA (US)

(72) Inventors: Reza Farivar, Champaign, IL (US); Jeremy Goodsitt, Champaign, IL (US); Fardin Abdi Taghi Abad, Seattle, WA (US); Austin Walters, Savoy, IL (US); Mark Watson, Urbana, IL (US); Anh Truong, Champaign, IL (US); Vincent Pham, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/414,598

(22) Filed: May 16, 2019

(51) Int. Cl.
| | | |
|---|---|---|
| *G06N 3/00* | (2006.01) | |
| *G06N 3/04* | (2006.01) | |
| *G06K 9/62* | (2006.01) | |
| *G06F 21/62* | (2013.01) | |
| *G06F 40/20* | (2020.01) | |

(52) U.S. Cl.
CPC ........... *G06N 3/04* (2013.01); *G06F 21/6245* (2013.01); *G06F 40/20* (2020.01); *G06K 9/6218* (2013.01); *G06K 9/6267* (2013.01)

(58) Field of Classification Search
CPC ...................................................... G06N 3/04
See application file for complete search history.

(56) References Cited

U.S. PATENT DOCUMENTS

| | | | |
|---|---|---|---|
| 5,819,226 A | 10/1998 | Gopinathan et al. | |
| 6,029,144 A | 2/2000 | Barrett et al. | |
| 6,839,682 B1 * | 1/2005 | Blume et al. | G06F 17/60 705/10 |

(Continued)

FOREIGN PATENT DOCUMENTS

EP      0897566 B1    2/1999

OTHER PUBLICATIONS

Hsieh et al., "Enhancing Consumer Behavior Analysis by Data Mining Techniques", 2009, International Journal of Information and Management Sciences, pp. 39-53. (Year: 2009).*

(Continued)

*Primary Examiner* — Hien D Khuu
(74) *Attorney, Agent, or Firm* — Bookoff McAndrews, PLLC

(57) ABSTRACT

Disclosed are methods, systems, and non-transitory computer-readable medium for training and using a neural network for subcluster classification. For example, a method may include receiving or generating a plurality of user data sets of users, grouping the plurality of user data sets into one or more clusters of user data sets, grouping each of the one or more clusters into a plurality of subclusters, training the neural network for each of the plurality of subclusters to associate the subcluster with sequential patterns found within the subcluster in order to generate a trained neural network, receiving a first series of transactions of a first user, inputting the first series of transactions into the trained neural network, and classifying the first user into a subcluster of the plurality of subclusters based on the first series of transactions of the first user input into the trained RNN.

15 Claims, 6 Drawing Sheets

(56) References Cited

U.S. PATENT DOCUMENTS

| | | | |
|---|---|---|---|
| 2009/0254971 A1* | 10/2009 | Herz et al. | G06Q 10/10 726/1 |
| 2012/0011040 A1 | 1/2012 | Beydler et al. | |
| 2013/0282548 A1* | 10/2013 | Sycoff | G06Q 40/04 705/37 |
| 2013/0282550 A1* | 10/2013 | Sycoff | G06Q 40/04 705/37 |
| 2015/0095247 A1* | 4/2015 | Duan | G06Q 30/0185 705/318 |
| 2018/0204215 A1* | 7/2018 | Hu et al. | G06F 21/316 |
| 2018/0218369 A1* | 8/2018 | Xiao et al. | G06Q 20/4016 |

OTHER PUBLICATIONS

Harris, "Credit scoring using the clustered support vector machine", 2015, Expert Systems with Applicaitons (ScienceDirect), pp. 741-750 (Year: 2015).*

Maryani et al., "Clustering and Profiling of Customers Using RFM for Customer Relationship Management Recommendations", 2017, IEEE. (Year: 2017).*

Sheshasaayee et al., "Implementation of Clustering Technique Based RFM Analysis for Customer Behaviour in Online Transactions", 2018 (Year: 2018).*

* cited by examiner

US 10,664,742 B1

SYSTEMS AND METHODS FOR TRAINING AND EXECUTING A RECURRENT NEURAL NETWORK TO DETERMINE RESOLUTIONS

TECHNICAL FIELD

Various embodiments of the present disclosure generally relate to training and executing a neural network for determining unique resolutions for a user, and more particularly, to uniquely training a recurrent neural network to associate user groups with transaction patterns and using the trained recurrent neural network to automatically generate user-specific resolutions to an individual user.

BACKGROUND

One frequently collected sequential flow of data may be electronic transactions of consumers. When an individual engages in electronic transactions (e.g., via use of credit card technologies, mobile pay, online payment accounts, etc.) throughout a given period of time, the transaction data for the particular individual is collected, monitored, and stored sequentially, at a server of the issuer of the transaction instrument. Thus, such a server may leverage the vast amount of sequentially stored transaction data in electronic repositories, to provide intelligent, electronically generated feedback in an automated environment. Especially with artificial neural networks (e.g., RNN) having capabilities to be trained on sequential inputs, it is highly desirable for a server to practically apply machine learning, to recognize patterns in consumer spending behaviors, and provide feedback accordingly.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed to train and execute a neural network (e.g., RNN) to determine resolutions.

In one embodiment, a computer-implemented method is disclosed for training and using a neural network for subcluster classification. The computer-implemented method may comprise: receiving or generating, by one or more processors, a plurality of user data sets of users, wherein each user data set in the plurality of user data sets comprises a user identification data of a user and a detailed user data of the user; grouping the plurality of the user data sets, by the one or more processors, into one or more clusters of user data sets; grouping, by the one or more processors, each of the one or more clusters into a plurality of subclusters; for each of the plurality of subclusters, training the neural network, by the one or more processors, to associate the subcluster with one or more sequential patterns found within the subcluster, based on one or more user data sets in the subcluster of the plurality of user data sets, to generate a trained neural network; receiving a first series of transactions of a first user; inputting, by the one or more processors, the first series of transactions into the trained neural network; and classifying, using the trained neural network, by the one or more processors, the first user into a subcluster of the plurality of subclusters to identify a classified subcluster of the first user, based on the first series of transactions of the first user input into the trained neural network.

In accordance with another embodiment, a computer system is disclosed for training and using a recurrent neural network for subcluster classification. The computer system may comprise: a memory having processor-readable instructions stored therein; and at least one processor configured to access the memory and execute the processor-readable instructions, which when executed by the processor configures the processor to perform a plurality of functions, including functions for: receiving or generating a plurality of user data sets, wherein each user data set of the plurality of user data sets comprises a user identification data of a user and a detailed user data of the user; grouping the plurality of the user data sets into one or more clusters of user data sets; grouping each of the one or more clusters into a plurality of subclusters; and for each of the plurality of subclusters, training the recurrent neural network to associate the subcluster with one or more sequential patterns found within the subcluster, based on the user data sets in the subcluster, to generate a trained recurrent neural network.

In accordance with another embodiment, a computer-implemented method is disclosed for training and using a neural network to determine relevant resolutions. The computer-implemented method may comprise: receiving or generating, by one or more processors, a plurality of user data sets, wherein each user data set of the plurality of user data sets comprises a user identification data of a user and a detailed user data of the user; removing, by the one or more processors, personally identifiable information from each of the plurality of user data sets; grouping the plurality of the user data sets, by the one or more processors, into one or more clusters of user data sets; grouping, by the one or more processors, each of the one or more clusters into a plurality of subclusters; for each of the plurality of subclusters, training, by the one or more processors, a neural network to associate the subcluster with one or more sequential patterns found within the subcluster, based on the user data sets in the subcluster, to generate a trained neural network; receiving, by the one or more processors, a first series of transactions of a first user; inputting, by the one or more processors, the first series of transactions into the trained neural network; classifying, using the trained neural network, by the one or more processors, the first user into a subcluster among the plurality of subclusters, based on the first series of transactions input into the trained neural network, to generate a classified subcluster of the first user; based on the classified subcluster of the first user, determining, by the one or more processors, whether a model user associated with the first user should be identified; based on the determination of whether the model user associated with the first user should be identified, searching, by the one or more processors, the plurality of user data sets for the user data set of the model user, wherein the user data set of the model user (i) is grouped into one of one or more model subclusters, wherein the one or more model subclusters is predetermined to be model subclusters among the plurality of subclusters, and (ii) comprises a second series of transactions having one or more transactions with identical attributes, compared to attributes of one or more transactions of the first series of transactions; based on both the first series of transactions and the second series of transactions, generating, by the one or more processors, an indicator of a resolution associated with the first series of transactions; converting, by the one or more processors, the indicator into a natural language statement; and displaying, by the one or more processors, the natural language statement on a device associated with the first user.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
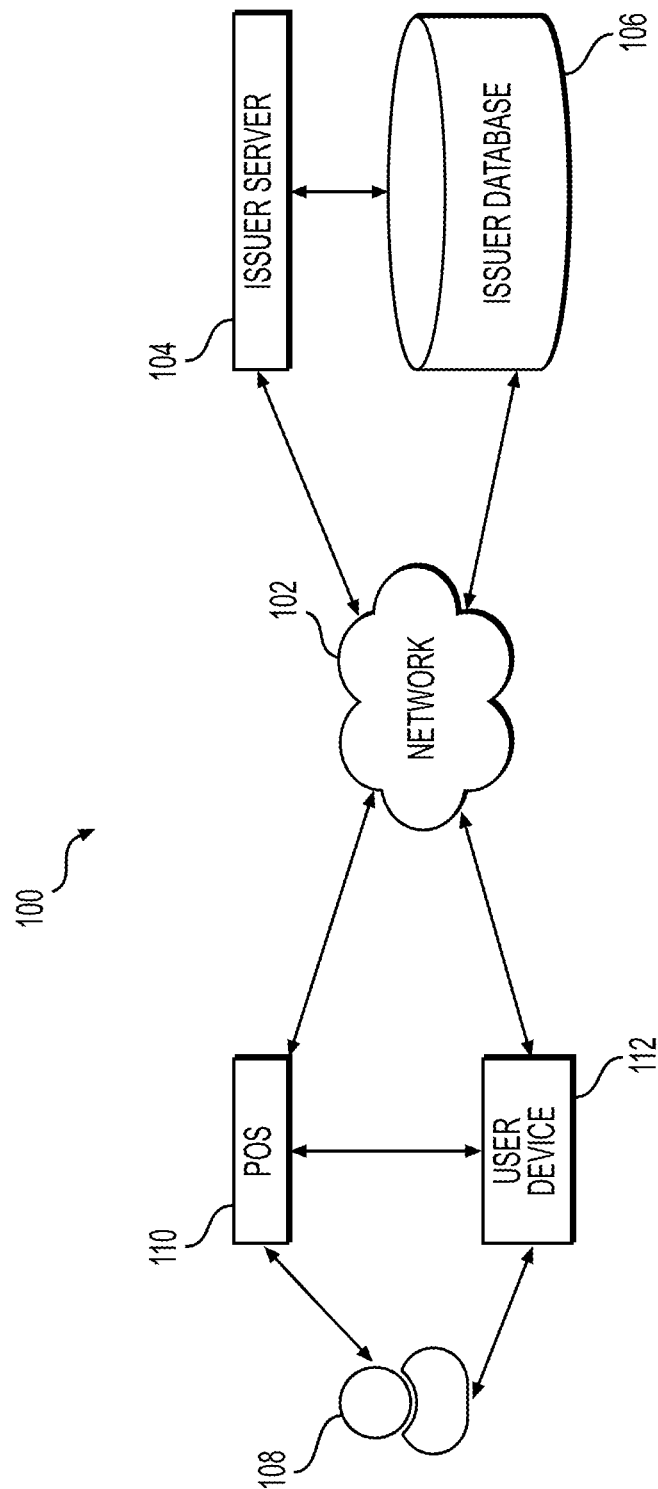
FIG. 1 depicts an example environment in which methods, systems, and other aspects of the present disclosure may be implemented.

The following embodiments describe systems and methods for training and executing a neural network such as, for example, a RNN, to determine resolutions. A specifically customized training of RNNs, combined with practical application of the respectively trained RNNs for providing user-specific feedback, are unconventional and innovative automations which necessarily achieve technological improvements through the specific process described more in detail below, in a sharp contrast to merely providing a well-known or routine environment for performing a manual or mental task. While RNNs are referenced throughout the application, alternative neural networks or decision support tools may be used. For example, any one or more of a convolutional neural network (CNN), a regional convolutional neural network (R-CNN), and/or a decision tree may be used without departing from the scope of the disclosure.

Many users of transaction instruments for electronic transactions (e.g., credit card technologies, mobile pay systems, online payment accounts, etc.) often make poor financial decisions such as impulsive purchases, serial purchases under hampered judgments (e.g., excessive gambling or alcohol consumption), or incurring of unnecessary expenses (e.g., penalties for failure to pay minimum balance(s)). According to aspects of the present disclosure, a unique subcluster-based training of an RNN may allow an issuer of a transaction instrument to use the trained RNN to dynamically, automatically, and accurately recognize users demonstrating poor financial decisions. If an observed user is classified by the RNN to be in a category characterized by poor financial decisions, one or more embodiments of the present disclosure may find a model user with similar historical behaviors from the training data set, and provide a unique resolution for the observed user based on an analysis of attributes of the observed users and the model user. Advantageously, such a resolution may be an automated, user-specific feedback, as described in more detail below.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Referring now to the appended drawings, FIG. 1 shows an example environment 100, according to one or more embodiments of the present disclosure. As shown, system environment 100, may include a network 102, an issuer server 104, an issuer database 106, a user 108, a point-of-sale (POS) system 110, and a user device 112.

The POS system 110 may be a hardware POS device at a physical location, such as a store, a restaurant, a transaction booth, a transaction cart, a food truck, an office, a place of residence, a vending machine, a gaming establishment, or any other physical location where purchase of goods or services may take place by a user 108 via an electronic transaction. The POS system 110 also may be a portable device carried by a merchant, a seller, a sales agent, or a delivery agent, which reads, accepts, or validates an electronic transaction, such as a credit card reader, a mobile payment reader, a payment processing application, or any other portable device serving the purpose of accepting and/or processing payments for commerce of goods or services. Additionally, or alternatively, the POS system 110 may be a virtual or online POS system for allowing a user 108 to engage in an electronic commerce transaction on a user device 112 over a network 102.

User 108 may engage in an electronic transaction with the POS system 110 in various ways. For example, user 108 may hand over a transaction instrument (e.g., a credit card, a debit card, etc.) to an operator of the POS system 110, initiate contact of the transaction instrument with the POS system 110 (e.g., by swiping, tapping, or inserting the transaction instrument), initiate contact of a user device 112 (e.g., a mobile phone) executing a mobile pay application to a POS system 110, connect a user device 112 executing a mobile pay application to POS system 110 via a near field communication (NFC) (e.g., contactless transaction instrument reader), or engage in an electronic transaction in any other manner which may allow the POS system 110 to directly or indirectly obtain information from the user's 108 transaction instrument.

Once the POS system 110 obtains sufficient data necessary to complete a particular transaction, the POS system 110 may transmit transaction data to the issuer server 104 over the network 102. This transmission of the transaction data to the issuer server 104 over network 102 may be a direct transmission or an indirect transmission (e.g., an initial transmission to an intermediary such as a card association system, followed by the intermediary transmitting at least a part of the data to the issuer server 104). The transaction data transmitted to the issuer server 104 may include any data received and/or generated by the POS system 110 during the transaction. For example, the transaction data may include a time stamp of the transaction, an identification of one or more merchants associated with the transaction, an identification of one or more purchasers associated with the transaction, an identification of one or more transaction instruments used in the transaction, an amount of fiscal resources expended for the transaction, and/or any other data relevant to the transaction and the POS system 110.

After collecting the transaction data, the issuer server 104 may record and store the transaction data in the issuer database 106. In system environment 100, the POS system 110 may transmit a separate transaction data for each transaction, and the issuer server 104 may, in turn, receive and store each individual transaction data separately for each respective transaction. Handling each transaction data as separate entries may not only serve the purpose of providing the most accurate fiscal accounting for the user, but also prepare the most effective and accurate data sets for the RNN's training and classification tasks described in more detail below.

In one or more embodiments, the issuer server 104 and the issuer database 106 may be one server computer device and a single database, respectively. Alternatively, in one or more embodiments, the issuer server 104 may be a server cluster, or any other collection or network of a plurality of computer servers. The issuer database 106 also may be a collection of a plurality of interconnected databases. The issuer server 104 and the issuer database 106 may be components of one server system. Additionally, or alternatively, the issuer server 104 and the issuer database 106 may be components of different server systems, with the network 102 serving as the communication channel between them.

Figure 2:
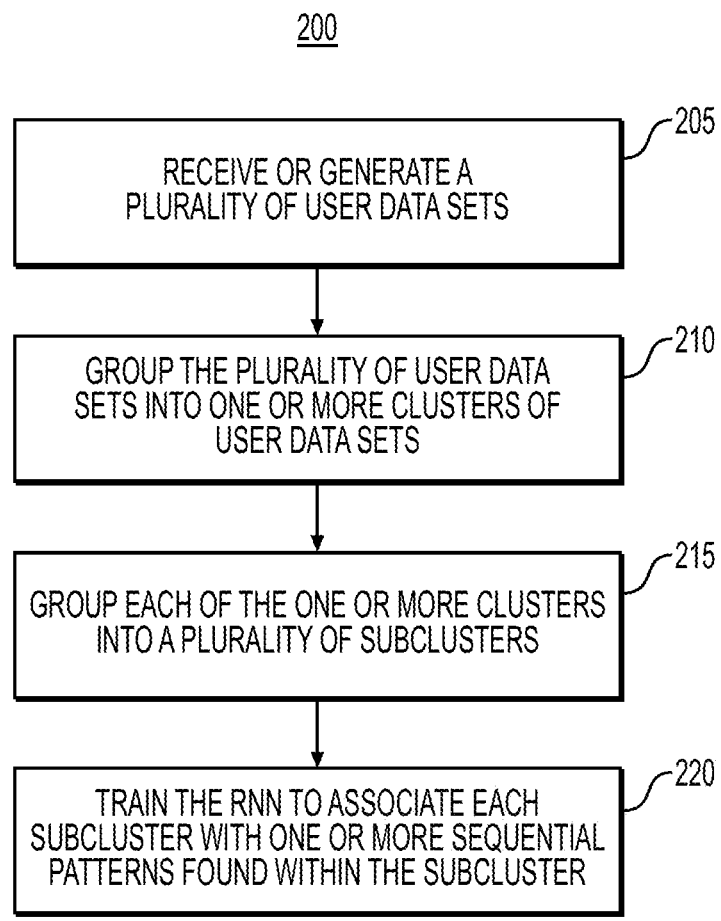
FIG. 2 depicts a flowchart of an exemplary method for generating a customized training dataset for an RNN and training the RNN using the training dataset, according to one or more embodiments.

FIG. 2 depicts a flowchart of an exemplary method 200 for generating a customized training data set for an RNN, and training the RNN using the training data set. In method 200, the issuer server 104 may first receive or generate a plurality of user data sets in an issuer database 106 (Step 205). Each user data set may comprise a user identification data of a user and a detailed user data of the user. For example, if a user data set corresponds to a data set of a particular credit card account of a first user, the user data set may include an identification of the first user (e.g., the full name, an address, or a unique identifier of the first user, an account identification, or any combination thereof), as well as a detailed user data (e.g., individual transactions made or authorized by the first user). In one or more embodiments, the detailed user data of each of the user data sets may be, for example, a collection of transaction data transmitted to the issuer server 104 from the POS system 110, pertaining particularly to the user account represented by the user data set.

In one or more embodiments, the plurality of user data sets in issuer database 106 may be anonymized and/or sanitized by removing, obfuscating, or converting all personally identifiable information from all of the user data sets. Personally identifiable information may be any data attribute subject to protection as defined by a predetermined criteria, and may include, for example, name, social security number, credit card number, expiry date information, email address, account number, an identifier of users associated with an account, an identifier of an account, contact information, or any other piece of information that is specific to the identity of the user or the user's account. In one or more embodiments, the plurality of user data sets may be anonymized by filtering the plurality of user data sets through a data filtering system which detects user data sets with personally identifiable information based on predetermined conditions, and removes and/or replaces the personally identifiable information. The personally identifiable information, though removed and/or blinded, may still be linked to the plurality of user data sets. The personally identifiable information may be stored in case the information is needed to verify a user or to comply with federal or other applicable law. For example, when the user securely logs onto the issuer server 104 for access to his or her own account, the issuer server 104 may access the user's name, address, social security number, birth date, or other personally identifiable information to verify that a valid user is accessing the information. The removed or blinded personally identifiable information may be placed in the same server as the server storing the anonymized and/or sanitized user data sets. If a system administrator of the issuer server 104 chooses, the personally identifiable information may be placed in a separate server for greater security.

Referring back to FIG. 2, the plurality of user data sets may then be grouped into clusters (Step 210). The grouping may be achieved by a clustering or classification of the user data sets, with one or more predetermined criteria as the parameters for grouping the user data sets. The predetermined criteria for grouping may include, for example, one or more of annual income, education level, family size, job category, or any other criteria which represents a user class independent of quality metrics of fiscal decisions. That is, the grouping operation of Step 210 may group users into one or more categories (e.g., socio-economic classes) without regard to user's fiscal decision behavior qualities. For example, in the exemplary scheme depicted in FIG. 4A, classified cluster 421 may represent "all users with annual income greater or equal to $100,000." As shown, cluster 421 may include both users with credit scores at or above 700, and users with credit scores below 700.

In some implementations, the grouping operation of Step 210 may occur using any measurement of similarity among the users, as long as the grouping is based on a criteria that is independent of fiscal decision behavior qualities. For example, users grouped into the same cluster may have a similar income level (e.g., incomes within a range of income), such that predictions can be made on attributes of a particular user based on data corresponding to other users in the same cluster. For the purpose of grouping in Step 210, any clustering algorithm that groups data sets based on a clustering criteria may be used. For implementing a clustering algorithm, the clustering data space may be defined as, for example, an n-dimensional space having an axis for each of the clustering criteria. For example, Step 210 may be implemented using a classical K-means clustering algorithm. Alternatively, Step 210 may be implemented using a more complex algorithm aiming for enhanced modeling results, such as, for example, a Density-Based Spatial Clustering of Applications with Noise (DBSCAN) approach.

After grouping into clusters, each cluster may then be grouped into a plurality of subclusters (Step 215). This grouping operation may be achieved by clustering or classification of the user data sets within each cluster, with one or more predetermined criteria as the parameters for grouping the user data sets. The predetermined criteria for grouping may include one or more of credit score, an account balance, available credit, percentage of credit used of users in each of the one or more clusters, or any other metrics which indicates a quality of fiscal decisions made by the user. The use of these metrics as classification criteria may result in multiple ranges of users within a particular cluster, including a range of users with higher quality metrics relating to fiscal decisions, in addition to one or more other ranges of users within the cluster with lower quality metrics relating to fiscal decisions, as will be described in further detail below. For example, as noted above, in the exemplary scheme depicted in FIG. 4A, classified cluster 421 may represent "all users with annual income greater or equal to $100,000." Additionally, cluster 421 may include a subcluster of users 411 with credit scores at or above 700, and may include a subcluster of users 412 with credit scores below 700. In this example, subcluster 411 may be indicative of users with higher quality metrics relating to fiscal decisions, while subcluster 412 may be indicative of users with lower quality metrics relating to fiscal decisions.

In some implementations, the grouping operation of Step 215 may occur using any measurement of similarity among the users, as long as the grouping of subclusters is based on a criteria associated with the users' quality of fiscal decisions (e.g., spending behavior). For example, with use of a Dynamic Time Warping (DTW) algorithm which compares sequences of different time-series data having different time instance and time interval, a dynamically customized clustering criteria, which incorporates the similarity of users' spending behaviors, may be determined. For the purpose of subcluster grouping in Step 215, any clustering algorithm that groups data sets based on a selected criteria may be used. For implementing such a clustering algorithm, the clustering data space may be defined as, for example, an n-dimensional space having an axis for each of the subclustering criteria. For example, Step 215 may be implemented using a classical K-means clustering algorithm. Alternatively, Step 215 may be implemented using a more complex algorithm aiming for enhanced modeling results, such as, for example, a Density-Based Spatial Clustering of Applications with Noise (DBSCAN) approach.

After the plurality of user data sets are grouped into subclusters, one or more of the subclusters may be recorded (e.g., stored, set, established, etc.) as model subclusters. The metrics used for grouping subclusters may serve as the basis for selecting model subclusters. One or more subclusters with metrics that are higher than predetermined thresholds may be selected as model subclusters. For example, as shown in the exemplary grouping scheme depicted in FIG. 4B, subclusters 441 and 442 may be recorded as model subclusters because they both represent users with credit scores (e.g., one or more metrics) being higher than 700 (e.g., a predetermined threshold for selecting model subclusters). The selection of model subclusters may be recorded in issuer database 106, or any other memory device accessible by issuer server 104.

Referring back to FIG. 2, after all user data sets are grouped into subclusters, an RNN may be trained based on the subclusters (Step 220). As described above with respect to Step 205, each user data set may include detailed user data, and the detailed user data may be a collection of transaction data transmitted to the issuer server 104 from the POS system 110, pertaining particularly to the user account represented by the user data set. Thus, a collection of a particular user's transaction data represents a history of purchase decisions made by the user, in a time-based sequence. Each subcluster may be provided as a training data set for the RNN, and the training data set may include at least the detailed user data of each user data set in the subcluster. Based on the training of the RNN, the RNN may associate each subcluster with one or more sequential patterns found within the subcluster.

The RNN being trained in Step 220 may be any type of RNN which can use an internal state (e.g., memory) to process sequences of inputs from the collection of transaction data of each user. In some implementations, LSTM may be the type of neural network used for the training of the model (e.g., Step 220) and the subsequent user classification (e.g., Step 315 as described in more detail below) in accordance with one or more embodiments of the present disclosure. For example, in a particular iteration of training and/or subsequent classification operations, an LSTM may compare two sequences of data, where each of the two sequences may have its own time-stamped data points. The data points in a given sequence may be fiscal transactions of the particular user to whom the sequence corresponds. For example, a first sequence may have four large time-stamped transactions (e.g., $100, $39, $90, and $40), and at respective time stamps sufficiently similar (e.g., within a threshold range) to these four transactions, a second sequence may also have four large, similar transactions (e.g., $98, $40, $85, and $35). In addition, the first sequence and the second sequence may both have smaller (e.g., smaller below a threshold) transactions, at disparate time stamps. After comparing these two sequences, the LSTM may output that the first sequence and the second sequence are matched successfully (e.g., belonging to the same subcluster, for the purpose of training a model and/or classifying a user), because of the similarity of the large transactions being considered and the dissimilarity of the smaller transactions being neglected. The RNN, such as the LSTM described by way of example above, may be stored in the issuer server 104, the issuer database 106, or any other memory device accessible by the issuer server 104.

Figure 3:
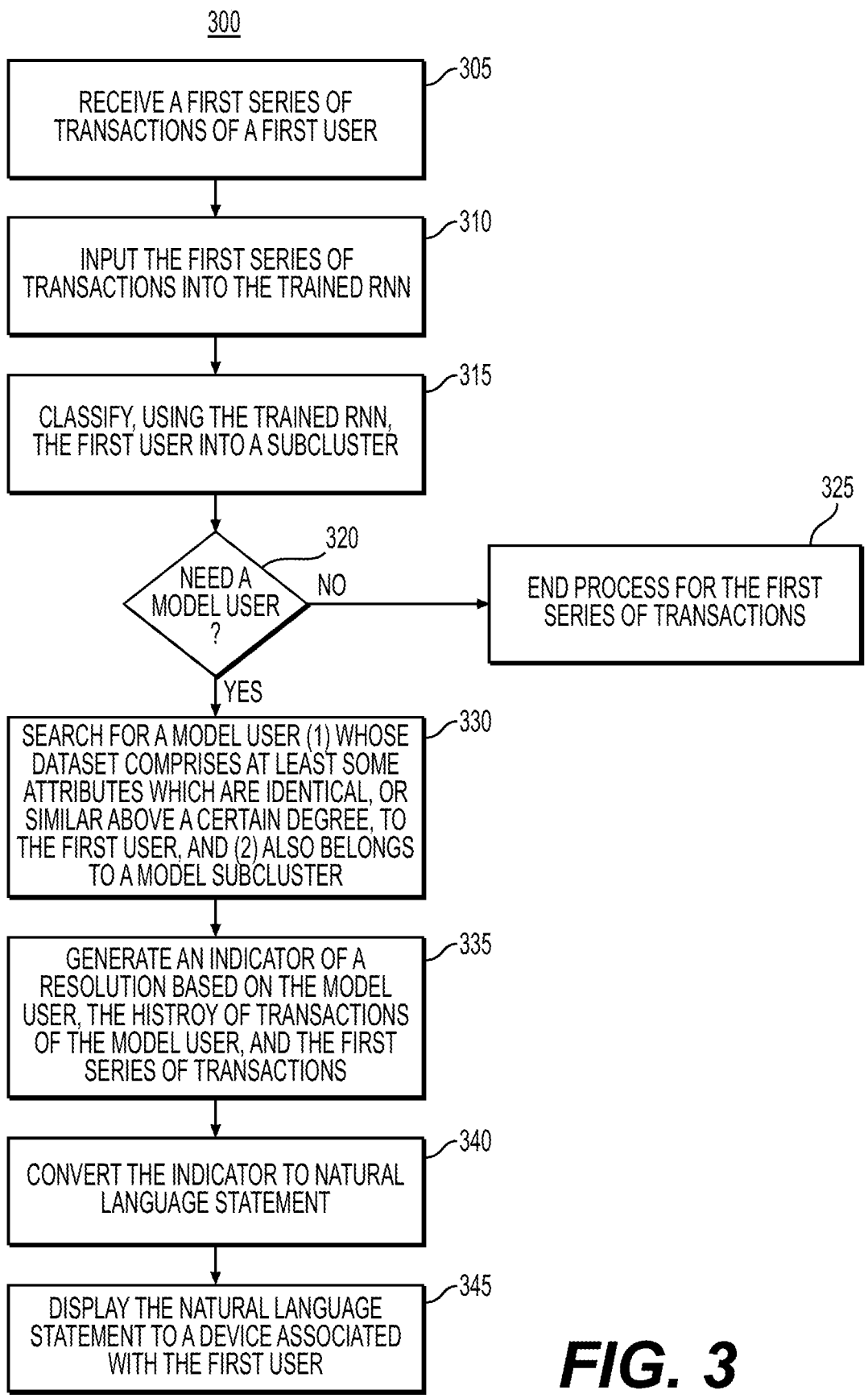
FIG. 3 depicts a flowchart of an exemplary method for receiving a series of transactions of a first user, using the trained RNN to classify the first user in to a cluster, conditionally finding a model user, and providing a resolution to the first user based on the model user, according to one or more embodiments.

FIG. 3 depicts a flowchart of an exemplary method 300 for receiving a particular series of transactions of a first user, using the trained RNN to classify the first user into a cluster, conditionally finding a model user, and providing a resolution to the first user based on the model user, according to one or more embodiments.

First, method 300 may begin with the issuer server 104 dynamically receiving a series of transactions, e.g., a first series of transactions, associated with a specific user, e.g., a first user (Step 305). In one or more embodiments, the process of dynamically receiving the first series of transactions (e.g., Step 305) may be initiated and performed independently of the process of preparing a training data set for an RNN and training the RNN (e.g., the exemplary method 200 of FIG. 2). For example, data collection for creation of a training data set for the RNN may occur at predetermined time intervals at a RNN training subsystem of the issuer server, while data collection of transactions for the purpose of creating resolutions for a first user may occur separately at another independent subsystem (e.g., user resolution subsystem). Accordingly, the user resolution subsystem may use any available previously trained RNN at the RNN training subsystem (e.g., the RNN last trained by the RNN training subsystem). The RNN training subsystem and the user resolution subsystem may both be subsystems implemented by the issuer server 104.

Alternatively, the process of receiving the first series of transactions in accordance with Step 305, may be performed by the issuer server 104, only after issuer server 104 completely performs a full iteration of the RNN training process in accordance with, for example, exemplary method 200 depicted in the flowchart of FIG. 2. Accordingly, the exemplary method 300 may only be performed after completion of a RNN training process, rather than, for example, allowing method 200 and method 300 to run independently of each other. In such an arrangement, the exemplary method 300 may be a continuation of the exemplary method 200.

In one or more embodiments, the dynamic receiving of the first series of transactions (e.g., Step 305) may be real-time, or substantially real-time, for each transaction within the first series of transactions. Additionally, or alternatively, the dynamic receiving of the first series of transactions (e.g., Step 305) may be conducted at a predetermined interval. For example, at midnight of each day, the issuer server 104 may retrieve all transactions made by the first user during the 24-hour interval, in a series of transactions sorted from oldest to newest, from a data source such as issuer database 106.

Next, as shown in FIG. 3, the first series of transactions may be input into the trained RNN (Step 310). As described above with respect to FIG. 2, the RNN may have been trained to make associations between one or more sequential patterns and a subcluster of users. Thus, the trained RNN may be uniquely customized for classifying this particular observed user (e.g., the first user with whom the first series of transactions are associated) to a particular subcluster of users, based on the first series of transactions of the first user.

Accordingly, the trained RNN may be used to classify the first user into a subcluster (Step 315). The output of the classification step may be, for example, one or more probability values for whether this user belongs to certain subclusters. For example, the output may indicate that according to the first series of transactions, the first user has a 90% chance of belonging to the subcluster with credit score less than 700, and 10% chance of belonging to the subcluster with credit score at or higher than 700. The output also may be a selection or identification of one subcluster, which has the highest likelihood of having the first user as a member.

With the output from the classification step, the issuer server 104 may proceed to determine whether a model user is necessary based on the first series of transactions of the first user (Step 320). A model user may be necessary if the trained RNN indicates, with a reasonable certainty, that the first series of transactions represents a high likelihood that the first user is being a poor decision maker at this time (e.g., the trained RNN associates the first series of transactions with a subcluster representing the poor fiscal spending behaviors). As described in more detail below, retrieval of a model user may provide benchmark data in automatically and intelligently formulating a resolution for the first user.

If the issuer server 104 determines that a model user is not necessary (Step 320: No), the issuer server 104 may end the process for seeking a resolution pertaining to the first series of transactions (Step 325). For example, if the first series of transactions is classified at Step 315 to be transactions representing good or successful fiscal spending behaviors (e.g., belonging to a subcluster with a relatively high range of credit scores), then the issuer server 104 may determine that a model user is not necessary. This filtering step may significantly reduce consumption of computing resources of the issuer server 104 (e.g., processor availability, power, memory, bandwidth, etc.), and ensure that the computing resources are utilized only for formulating critical resolutions. In making this determination, the threshold and/or criteria for determining which subclusters are deemed to necessitate a model user may be predetermined parameters. For example, subclusters deemed to represent poor fiscal decisions, for the purpose of this determination, may be predetermined to be any subcluster indicative of users with a credit score less than 700, and a threshold for necessitating a model user may be predetermined to be 80% or greater on the likelihood of belonging to such a subcluster.

If the issuer server 104 determines that a model user is necessary (Step 320: Yes), the issuer server 104 may search for a model user (Step 330). A model user may be a user (1) whose data set comprises at least some attributes which are identical, or similar above a certain degree, to the first user, and (2) also belongs to a model subcluster. The data collection from which a model user is selected may be the training data set of the RNN, which may already be classified using clusters and subclusters. Additionally, or alternatively, the data collection may be another set of user data sets, such as a superset of the training data set, big data pertaining to the issuer of the transaction instrument, or any other group of user data sets in the issuer server 104 or issuer database 106 indicative of the quality of fiscal decisions made by users.

As noted above, a model user may be a user whose data set comprises at least some attributes which are at least partially identical, or similar above a certain degree, to the first user. For example, a model user may have a history of a sequence of transactions that may be identical in one or more aspects to the first series of transactions of the first user, such as the first user's recent transactions having a series of 12 gambling charges within 24 hours and the model user's history having a series of 10 gambling charges within 24 hours. In selecting a model user, the threshold or criteria for determining that the model user's attributes are "partially identical" or "similar above a certain degree" to the attributes of a first user may be predetermined parameters. For example, a numerical attribute of the model user being within a range between 20% above and 20% below a numerical attribute of the first user may be predetermined to be "partially identical" or "similar above a certain degree." Additionally, or alternatively, a model user may be selected by collecting a pool of candidate user data sets from the plurality of user data sets, ranking the candidate user data sets by quantified similarity metrics (e.g., percentage difference against attributes of the first user), and selecting the top ranked user data set.

Additional requirements for selection of a model user may be that (i) the series of similar transactions is not currently ongoing, and (ii) the model user is currently placed into a model subcluster despite having the history of similar transactions with the observed user. For example, a candidate model user may meet the first requirement (e.g., having similar attributes in transaction history as that of the first user), but may fail to meet the second requirement because the candidate model user has not been placed into a model subcluster. As another example, a candidate model user who has met the first requirement (e.g., having similar attributes in transaction history as that of the first user) based on history, may be selected as the model user if the issuer server 104 confirms that this candidate is now classified in a model subcluster. As described with respect to the exemplary method 200 depicted in FIG. 2 and the example scheme 400B of FIG. 4B, model subclusters 441 and 442 may be particular subclusters designated and recorded as model subclusters in issuer database 106 or any other memory device accessible by issuer server 104. The issuer server 104 may designate subclusters with quality metrics (e.g., credit score, account balance, available credit, percentage of credit used of users in each of the one or more clusters, etc.) that are higher than predetermined thresholds, as model subclusters.

After selecting the model user, the issuer server 104 may generate an indicator of a resolution for the first user, based on the model user, the identical or similar series of transactions found in the model user's history, and the first series of transactions of the first user (Step 335). The indicator, for example, may be any data set which includes one or more relevant contents of both (i) the first series of transactions of the first user and (ii) the identical or similar series of transactions found in the model user's history. An example indicator of a resolution may be stored as shown in Table 1.

TABLE 1

| FIRST USER TRANSACTION | | MODEL USER ATTRIBUTES | |
| --- | --- | --- | --- |
| transaction location | casino | transaction location | casino |
| spending category | gambling | spending category | gambling |
| spending subtotal | $880.00 | spending subtotal | $250.00 |
| spending category | Alcohol | spending category | alcohol |
| spending subtotal | $342.00 | spending subtotal | $50.00 |
| total spent | $1,222.00 | total spent | $300.00 |
| subcluster attribute | credit score <600 | subcluster attribute | credit score >800 |

After generating the indicator of resolution, the issuer server may convert the indicator to a natural language statement (Step 340). This conversion may occur when the issuer server 104 implements a natural language processing (NLP) engine using the generated indicator, via NLP techniques or algorithms such as a rule-based NLP, a statistical NLP, or any other known NLP techniques capable of adding natural language syntax and words of a predetermined language (e.g., English) to the raw data set forth by the indicator. For example, the indicator shown in Table 1 may be converted to the following natural language statement: "We noticed that you have been spending a lot of money in the past 12 hours at a casino. Let's stop and look at another customer's casino spending. Mark (not real name) has a credit score above 800, which is excellent. When Mark went to a casino, he only spent $50 on alcohol and $250 on gambling, while you have spent $342 so far tonight on alcohol and $880 on gambling. We suggest you take a cue from Mark!"

After the conversion to the natural language statement is complete, the issuer server 104 may cause or initiate a display of the natural language statement to the user device 112 of the first user (Step 345). In some implementations, any user 108 may intentionally and voluntarily set a user preference at an application of the user device 112 such that the user's fiscal spending is regularly monitored, analyzed by an artificial intelligence, and potentially lead to a notification to the user 108, in accordance with the exemplary method 300. Alternatively, an application of the user device 112 may be programmed to perform the exemplary method 300 by its original setting, such that the application, by default, delivers the user 108 with a virtual assistant which constantly monitors, using artificial intelligence, and automatically notifies the user 108 using uniquely customized resolutions. Whether an implementation of the exemplary method 300 is voluntary or involuntary, a recurring use of a specifically trained RNN, execution of a rule-based search algorithm for identification of a model user, and generation of a uniquely-tailored message for the user 108 are integrated together to result in improvements in RNN technologies, machine-learning-based automation of behavior monitoring tools, and front-end automated technological services provided to users of transaction instruments.

Figure 4A:
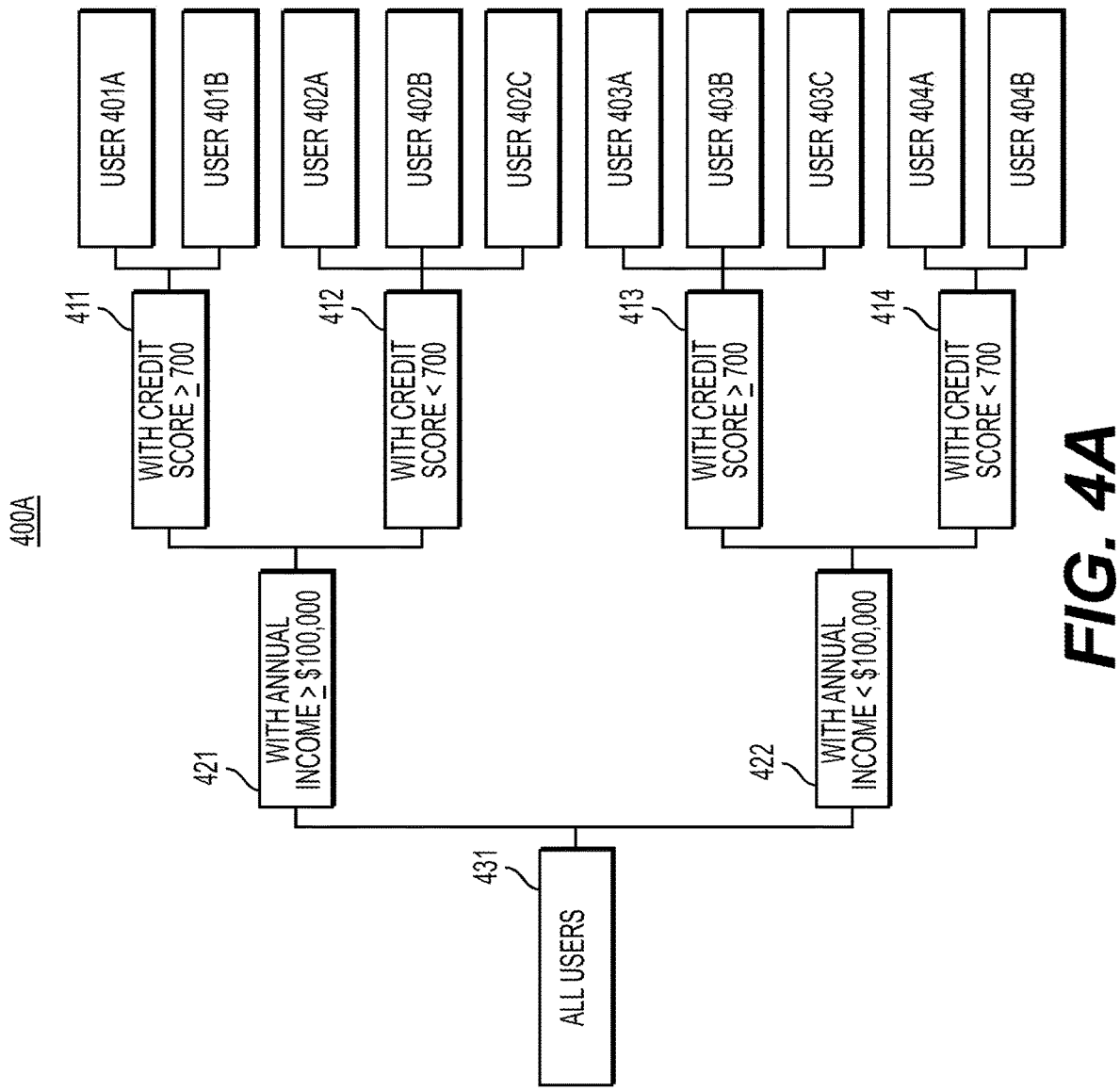
FIG. 4A depicts an example scheme of how users may be grouped into clusters and subclusters, according to one or more embodiments.

FIG. 4A depicts an example scheme 400A of how users 401A-404B may be grouped into clusters and subclusters, according to one or more embodiments. As described above with respect to FIG. 2, a general collection of users 431 may be grouped into clusters at a first level of data hierarchy, such as within cluster 421 indicative of those users with annual income at or above a threshold value, and cluster 422 indicative of those users with annual income below the threshold value. One or more predetermined criteria for grouping at this level may include one or more of annual income, education level, family size, job category, or any other criteria which represents a user class independent of quality metrics of fiscal decisions. Subsequently, the clusters 421 and 422 may each be grouped into subclusters at a second level of data hierarchy, such as a subcluster 411 indicative of users with a credit score at or above a threshold value and another subcluster 412 indicative of users with a credit score below the threshold value. The predetermined criteria for grouping may include one or more of credit score, an account balance, available credit, percentage of credit used, or any other metric which indicates a quality of fiscal decisions made by the user. In the example scheme 400A, users 401A-401B may be grouped under subcluster 411, users 402A-402C may be grouped under subcluster 412, users 403A-403C may be grouped under subcluster 413, and users 404A-404B may be grouped under subcluster 414, in the training data set of the RNN. As described above with respect to FIG. 2, this scheme may be implemented on a plurality of user data sets, by clustering, grouping, or labeling the user data sets according to these clusters and subclusters, in one or more memory devices accessible by issuer server 104 such as issuer database 106.

Figure 4B:
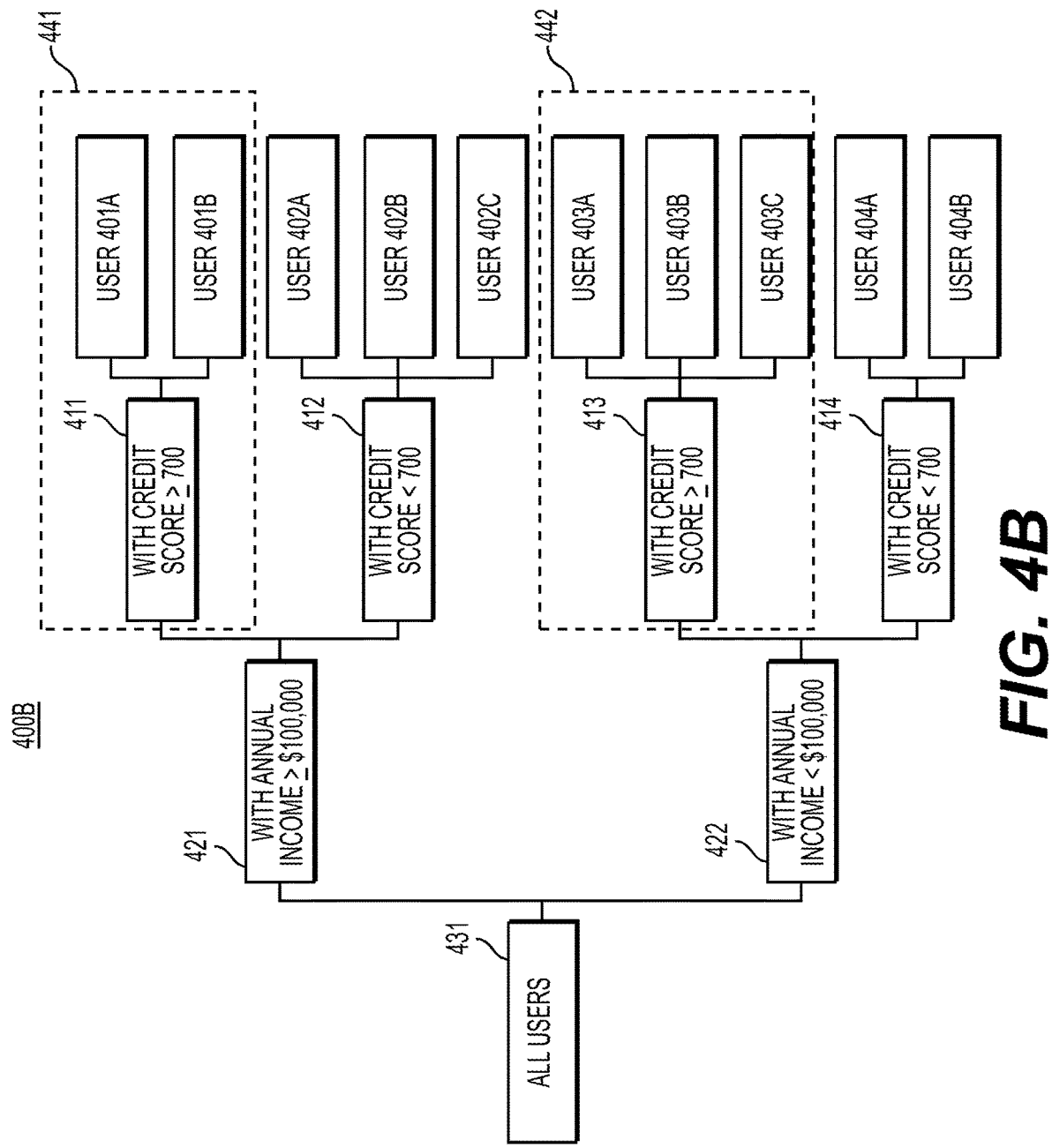
FIG. 4B depicts an example scheme of how subclusters may be predetermined to be model subclusters, according to one or more embodiments.
Figure 5:
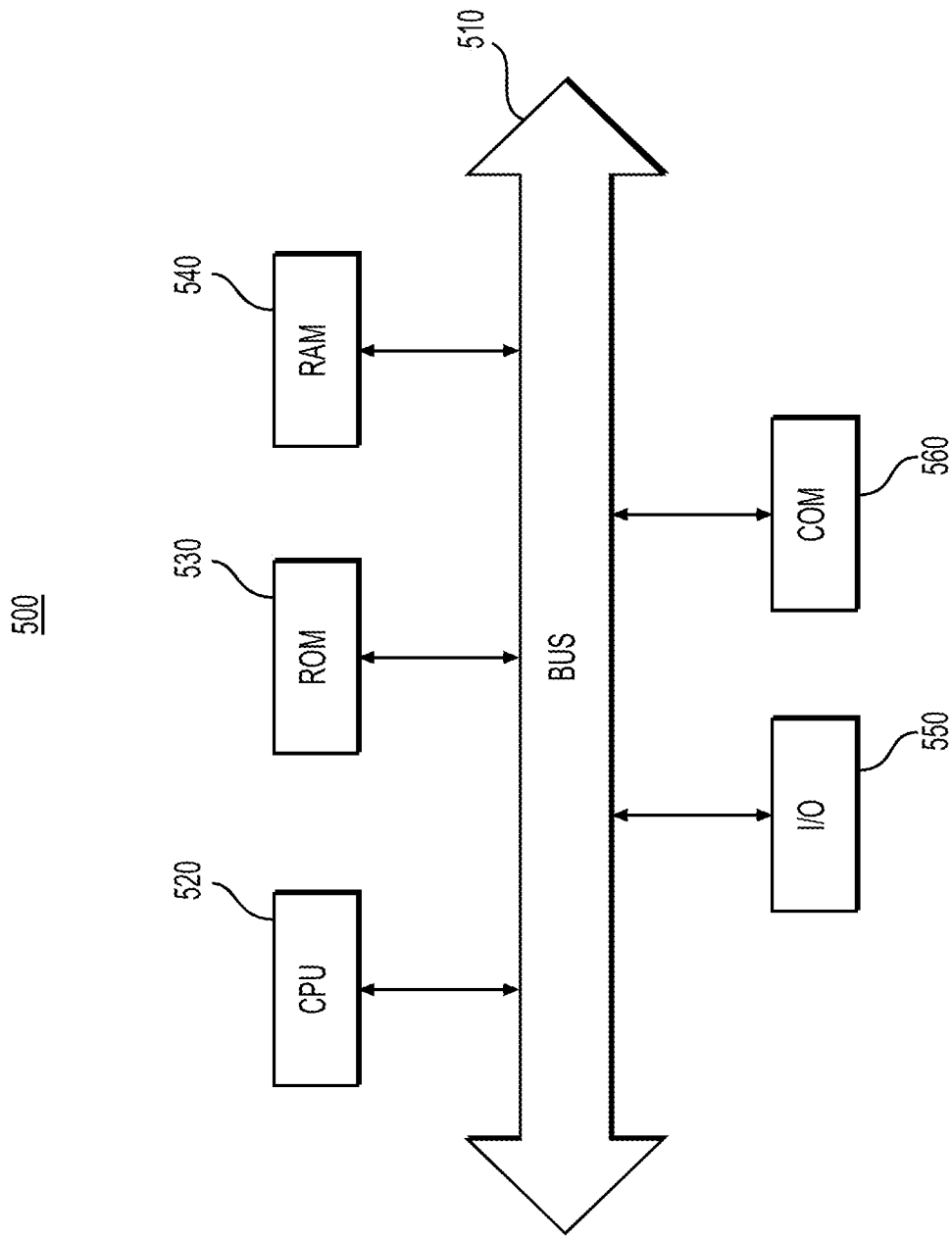
FIG. 5 depicts an exemplary computer device or system, in which embodiments of the present disclosure, or portions thereof, may be implemented.

FIG. 4B depicts an example scheme 400B of how subclusters may be predetermined to be model subclusters, according to one or more embodiments. As shown, the example scheme 400B groups the general collection of users 431 in the same manner as the scheme 400A, but additionally illustrates designation of model clusters 441 and 442. As shown in the example scheme 400B, subclusters 441 and 442 may be recorded as model subclusters, because they both represent users with credit score (e.g., one or more metrics) being higher than 700 (e.g., a predetermined threshold for selecting model subclusters). The selection of model subclusters may be recorded in issuer database 106, or any other memory device accessible by issuer server 104. In the exemplary scheme 400B, users 401A-401B may be grouped under subcluster 411, users 402A-402C may be grouped under subcluster 412, users 403A-403C may be grouped under subcluster 413, and users 404A-404B may be grouped under subcluster 414, in the training data set of the RNN. Of these users, users 401A, 401B, 403A, 403B, and 403C may be users who belong to model subclusters based on their quality metrics relating to fiscal decisions FIG. 5 depicts a high-level functional block diagram of an exemplary computer device or system, in which embodiments of the present disclosure, or portions thereof, may be implemented, e.g., as computer-readable code. In some implementations, the issuer server 104 (depicted in FIG. 1) may correspond to device 500. Additionally, or alternatively, a server system comprising the issuer server 104 and the issuer database 106 (depicted in FIG. 1) may correspond to device 500. Additionally, each of the exemplary computer servers, databases, user interfaces, and methods described above with respect to FIGS. 1-4B can be implemented in device 500 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-4B.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-4B, may be implemented using device 500. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 5, device 500 may include a central processing unit (CPU) 520. CPU 520 may be any type of processor device including, for example, any type of special purpose or a general-purpose microprocessor device. As will be appreciated by persons skilled in the relevant art, CPU 520 also may be a single processor in a multi-core/multi-processor system, such system operating alone, or in a cluster of computing devices operating in a cluster or server farm. CPU 520 may be connected to a data communication infrastructure 510, for example, a bus, message queue, network, or multi-core message-passing scheme.

Device 500 also may include a main memory 540, for example, random access memory (RAM), and also may include a secondary memory 530. Secondary memory 530, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 530 may include other similar means for allowing computer programs or other instructions to be loaded into device 600. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 500.

Device 500 also may include a communications interface ("COM") 560. Communications interface 560 allows software and data to be transferred between device 500 and external devices. Communications interface 560 may include a modem, a network interface (such as an Ethernet card), a communications port, a PCMCIA slot and card, or the like. Software and data transferred via communications interface 560 may be in the form of signals, which may be electronic, electromagnetic, optical, or other signals capable of being received by communications interface 560. These signals may be provided to communications interface 560 via a communications path of device 500, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for training and using a neural network for subcluster classification, the method comprising:

receiving or generating, by one or more processors, a plurality of user data sets of users, wherein each user data set in the plurality of user data sets comprises a user identification data of a user and a detailed user data of the user;

grouping the plurality of the user data sets, by the one or more processors, into one or more clusters of user data sets;

grouping, by the one or more processors, each of the one or more clusters into a plurality of subclusters;

for each of the plurality of subclusters, training the neural network, by the one or more processors, to associate the subcluster with one or more sequential patterns found within the subcluster, based on one or more user data sets in the subcluster of the plurality of user data sets, to generate a trained neural network;

receiving a first series of transactions of a first user;

inputting, by the one or more processors, the first series of transactions into the trained neural network;

classifying, using the trained neural network, by the one or more processors, the first user into a subcluster of the plurality of subclusters to identify a classified subcluster of the first user, based on the first series of transactions of the first user input into the trained neural network;

based on the classified subcluster of the first user, determining, by the one or more processors, whether a model user associated with the first user should be identified; and based on the determination of whether the model user associated with the first user should be identified, searching, by the one or more processors, the plurality of user data sets for the user data set of the model user, wherein the user data set of the model user (i) is grouped into one of one or more model subclusters, wherein the one or more model subclusters is predetermined to be model subclusters among the plurality of subclusters, and (ii) comprises a second series of transactions having one or more transactions with identical attributes, compared to attributes of one or more transactions of the first series of transactions.

2. The method of claim 1, wherein the grouping of the plurality of the user data sets into one or more clusters of user data sets is based on one or more of annual income, education level, family size, or job category of the users.

3. The method of claim 2, wherein the grouping of the each of the one or more clusters into a plurality of subclusters is based on one or more of credit score, an account balance, available credit, or percentage of credit used of users in each of the one or more clusters.

4. The method of claim 1, wherein the step of receiving or generating a plurality of user data sets of users further comprises:

removing, by the one or more processors, personally identifiable information from each of the plurality of user data sets.

5. The method of claim 1, wherein the method further comprises:

based on both the first series of transactions and the second series of transactions, generating, by the one or more processors, an indicator of a resolution associated with the first series of transactions.

6. The method of claim 5, wherein the generating the indicator of the resolution further comprises converting the indicator into a natural language statement.

7. The method of claim 6, wherein the method further comprises:

displaying, by the one or more processors, the natural language statement on a device associated with the first user.

8. A computer system for training and using a recurrent neural network for subcluster classification, the computer system comprising:

a memory having processor-readable instructions stored therein; and at least one processor configured to access the memory and execute the processor-readable instructions, which when executed by the processor configures the processor to perform a plurality of functions, including functions for:

receiving or generating a plurality of user data sets, wherein each user data set of the plurality of user data sets comprises a user identification data of a user and a detailed user data of the user;

grouping the plurality of the user data sets into one or more clusters of user data sets;

grouping each of the one or more clusters into a plurality of subclusters;

for each of the plurality of subclusters, training the recurrent neural network to associate the subcluster with one or more sequential patterns found within the subcluster, based on the user data sets in the subcluster, to generate a trained recurrent neural network;

receiving a first series of transactions of a first user;

inputting the first series of transactions into the trained recurrent neural network;

classifying, using the trained recurrent neural network, the first user into a subcluster of the plurality of subclusters, based on the first series of transactions input into the trained recurrent neural network, to qenerate a classified subcluster of the first user;

based on the classified subcluster of the first user, determining whether a model user associated with the first user should be identified; and if the determination of whether the model user associated with the first user should be identified is that the model user should be identified, searching the plurality of user data sets for the user data set corresponding to the model user, wherein the user data set of the model user (i) is grouped into one of one or more model subclusters, wherein the one or more model subclusters is predetermined to be model subclusters among the plurality of subclusters, and (ii) comprises a second series of transactions having one or more transactions with identical attributes, compared to attributes of one or more transactions of the first series of transactions.

9. The system of claim 8, wherein the plurality of functions further comprise:

if the determination of whether the model user associated with the first user should be identified is that the model user should be identified, generating an indicator of a resolution associated with the first series of transactions, based on both the first series of transactions and the second series of transactions.

10. The system of claim 9, wherein the generating the indicator of the resolution further comprises converting the indicator into a natural language statement.

11. The system of claim 10, wherein the plurality of functions further comprises:

if the determination of whether the model user associated with the first user should be identified is that the model user should be identified, displaying the natural language statement on a device associated with the first user.

12. The system of claim 8, wherein the grouping of the plurality of the user data sets into one or more clusters of user data sets is based on one or more of annual income, education level, family size, or job category of the users.

13. The system of claim 12, wherein the grouping of the each of the one or more clusters into a plurality of subclusters is based on one or more of credit score, an account balance, available credit, or percentage of credit used of users in each of the one or more clusters.

14. The system of claim 8, wherein the plurality of functions further comprises:

removing personally identifiable information from each of the plurality of user data sets.

15. A computer-implemented method for training and using a neural network to determine relevant resolutions, the method comprising:

receiving or generating, by one or more processors, a plurality of user data sets, wherein each user data set of the plurality of user data sets comprises a user identification data of a user and a detailed user data of the user;

removing, by the one or more processors, personally identifiable information from each of the plurality of user data sets;

grouping the plurality of the user data sets, by the one or more processors, into one or more clusters of user data sets;

grouping, by the one or more processors, each of the one or more clusters into a plurality of subclusters;

for each of the plurality of subclusters, training, by the one or more processors, a neural network to associate the subcluster with one or more sequential patterns found within the subcluster, based on the user data sets in the subcluster, to generate a trained neural network;

receiving, by the one or more processors, a first series of transactions of a first user;

inputting, by the one or more processors, the first series of transactions into the trained neural network;

classifying, using the trained neural network, by the one or more processors, the first user into a subcluster among the plurality of subclusters, based on the first series of transactions input into the trained neural network, to generate a classified subcluster of the first user;

based on the classified subcluster of the first user, determining, by the one or more processors, whether a model user associated with the first user should be identified;

based on the determination of whether the model user associated with the first user should be identified, searching, by the one or more processors, the plurality of user data sets for the user data set of the model user, wherein the user data set of the model user (i) is grouped into one of one or more model subclusters, wherein the one or more model subclusters is predetermined to be model subclusters among the plurality of subclusters, and (ii) comprises a second series of transactions having one or more transactions with identical attributes, compared to attributes of one or more transactions of the first series of transactions;

based on both the first series of transactions and the second series of transactions, generating, by the one or more processors, an indicator of a resolution associated with the first series of transactions;

converting, by the one or more processors, the indicator into a natural language statement; and displaying, by the one or more processors, the natural language statement on a device associated with the first user.

* * * * *